(12) United States Patent
Wortmann et al.

(10) Patent No.: US 11,872,723 B2
(45) Date of Patent: Jan. 16, 2024

(54) METHOD FOR PRODUCING A RUBBER MIXTURE WITH DETECTION OF VOLATILE ORGANIC COMPOUNDS

(71) Applicant: Continental Reifen Deutschland GmbH, Hannover (DE)

(72) Inventors: Christopher Wortmann, Langenhagen (DE); Frank Stefan Steiner, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 866 days.

(21) Appl. No.: 16/632,343

(22) PCT Filed: Apr. 26, 2018

(86) PCT No.: PCT/EP2018/060657
§ 371 (c)(1),
(2) Date: Jan. 18, 2020

(87) PCT Pub. No.: WO2019/015819
PCT Pub. Date: Jan. 24, 2019

(65) Prior Publication Data
US 2020/0171708 A1    Jun. 4, 2020

(30) Foreign Application Priority Data
Jul. 19, 2017    (DE) ............... 10 2017 212 387.7

(51) Int. Cl.
*B29B 7/28* (2006.01)
*B29B 7/18* (2006.01)
(Continued)

(52) U.S. Cl.
CPC .............. *B29B 7/286* (2013.01); *B29B 7/183* (2013.01); *B29B 7/7466* (2013.01);
(Continued)

(58) Field of Classification Search
CPC ....... B29B 7/286; B29B 7/183; B29B 7/7466; B29B 7/7485; B29B 7/7495; B29B 7/845;
(Continued)

(56) References Cited

U.S. PATENT DOCUMENTS 2,985,909 A * 5/1961 Joyner .................... B29B 7/246
366/291
3,572,645 A * 3/1971 Matsuoka ............... B29B 7/248
366/76.7
(Continued)

FOREIGN PATENT DOCUMENTS

DE    2456398 A1    6/1976
DE    4027261 C1    12/1991
(Continued)

OTHER PUBLICATIONS

International Search Report dated Jul. 2, 2018 of international application PCT/EP2018/060657 on which this application is based.

*Primary Examiner* — Charles Cooley

(57) ABSTRACT

A process for producing a rubber mixture in a mixing apparatus having at least one mixing chamber (4, 4') in which rotors (5) are disposed, wherein a plant control system process parameters (especially the speed of the rotors (5), the suction output of a suction device (13, 14, 15) and the mixing time) are controlled by open- and closed-loop control is provided, wherein at least one rubber is mixed in the mixing chamber with at least one filler, especially silica, preferably with addition of at least one coupling agent, especially a silane, and wherein the gas mixture present in and above the mixing chamber is sucked out by the suction device, wherein volatile organic compounds, especially alcoholic gases, present in the gas mixture sucked in are detected continuously, wherein, in the event of exceedance of a concentration of organic compounds in the gas mixture sucked in that has been defined as the control limit, the
(Continued)

concentration measured is employed as control variable in the plant control system for closed-loop control of at least one of the process parameters, and wherein, in the event of exceedance of a concentration of organic compounds in the gas mixture sucked in that has been defined as the safety limit, there is a safety shutdown of the mixing apparatus via the plant control system.

18 Claims, 1 Drawing Sheet

(51) Int. Cl.
    *B29B 7/74*     (2006.01)
    *B29B 7/84*     (2006.01)
    *B29B 7/90*     (2006.01)
    *C08J 3/20*     (2006.01)
    *C08K 3/36*     (2006.01)
    *C08K 9/06*     (2006.01)
    *B29K 509/02*     (2006.01)

(52) U.S. Cl.
    CPC .......... *B29B 7/7485* (2013.01); *B29B 7/7495* (2013.01); *B29B 7/845* (2013.01); *B29B 7/90* (2013.01); *C08J 3/203* (2013.01); *C08K 3/36* (2013.01); *C08K 9/06* (2013.01); *B29K 2509/02* (2013.01)

(58) Field of Classification Search
    CPC ... B29B 7/90; B29B 7/22; C08J 3/203; C08K 3/36; C08K 9/06; B29K 2509/02; B29C 2948/92419; B29C 48/767; B29C 48/965; G08B 21/14
    See application file for complete search history.

(56) References Cited

U.S. PATENT DOCUMENTS

| | | | | |
|---|---|---|---|---|
| 3,951,389 A * | 4/1976 | Porter | | B29B 7/183 |
| | | | | 702/57 |
| 4,818,113 A * | 4/1989 | Patel | | B29B 7/823 |
| | | | | 366/77 |
| 4,830,506 A * | 5/1989 | Borzenski | | B29B 7/7495 |
| | | | | 366/97 |
| 4,877,328 A * | 10/1989 | Muller | | B29B 7/246 |
| | | | | 366/97 |
| 4,910,237 A * | 3/1990 | Peter | | B29B 7/7495 |
| | | | | 422/135 |
| 4,953,984 A * | 9/1990 | Miyoshi | | B29B 7/183 |
| | | | | 366/97 |
| 5,061,078 A * | 10/1991 | Yada | | B29B 7/183 |
| | | | | 366/97 |
| 5,108,188 A * | 4/1992 | Peter | | B29B 7/246 |
| | | | | 264/28 |
| 5,183,640 A * | 2/1993 | Peter | | B29B 7/7466 |
| | | | | 422/135 |
| 5,251,977 A * | 10/1993 | Peter | | B29B 7/263 |
| | | | | 366/97 |
| 5,324,107 A * | 6/1994 | Tanaka | | B29B 7/283 |
| | | | | 366/601 |
| 5,368,383 A * | 11/1994 | Peter | | B29B 7/186 |
| | | | | 366/97 |
| 5,415,823 A * | 5/1995 | Peter | | B29B 7/7495 |
| | | | | 366/77 |
| 5,496,107 A * | 3/1996 | Peter | | B29C 48/375 |
| | | | | 366/97 |
| 5,529,390 A * | 6/1996 | Giani | | B29B 7/246 |
| | | | | 366/76.6 |
| 5,593,226 A * | 1/1997 | Peter | | B29B 7/7495 |
| | | | | 366/77 |
| 5,783,983 A * | 7/1998 | Ureshino | | B29B 7/183 |
| | | | | 366/150.1 |
| 5,865,535 A * | 2/1999 | Edwards | | B29B 7/246 |
| | | | | 366/601 |
| 6,422,733 B1 * | 7/2002 | Adams | | B29B 7/7495 |
| | | | | 366/76.7 |
| 6,828,361 B2 * | 12/2004 | Peter | | B29B 7/82 |
| | | | | 524/492 |
| 6,902,312 B2 * | 6/2005 | Peter | | B29B 7/246 |
| | | | | 366/97 |
| 9,023,938 B2 * | 5/2015 | Loubaresse | | B29B 7/103 |
| | | | | 524/575.5 |
| 9,056,290 B2 * | 6/2015 | Ozawa | | B29B 7/183 |
| 9,643,338 B2 * | 5/2017 | Edwards | | B29B 7/823 |
| 10,413,876 B2 * | 9/2019 | Urakami | | B29B 7/183 |
| 2002/0123555 A1 | 9/2002 | Peter et al. | | |
| 2004/0213075 A1 * | 10/2004 | Proni | | B29B 7/28 |
| | | | | 366/76.7 |
| 2007/0025176 A1 * | 2/2007 | Naoi | | B29B 7/283 |
| | | | | 366/76.7 |
| 2013/0018141 A1 * | 1/2013 | Oda | | C08J 3/247 |
| | | | | 366/100 |
| 2014/0016428 A1 * | 1/2014 | Akai | | B29B 7/286 |
| | | | | 366/76.2 |
| 2014/0291876 A1 * | 10/2014 | Yada | | B29B 17/0005 |
| | | | | 264/37.29 |
| 2015/0036449 A1 * | 2/2015 | Ozawa | | B29B 7/283 |
| | | | | 366/69 |
| 2017/0225132 A1 * | 8/2017 | Ozawa | | B29B 7/283 |
| 2017/0225359 A1 * | 8/2017 | Manabe | | B01F 35/214 |
| 2018/0290337 A1 * | 10/2018 | Steiner | | B29B 7/244 |
| 2020/0171708 A1 * | 6/2020 | Wortmann | | B29B 7/90 |

FOREIGN PATENT DOCUMENTS

| | | |
|---|---|---|
| EP | 0618054 A1 | 10/1994 |
| EP | 1213110 A1 | 6/2002 |
| GB | 1517330 A | 7/1978 |
| JP | H11300811 A | 11/1999 |
| JP | 2006123272 A | 5/2006 |

* cited by examiner

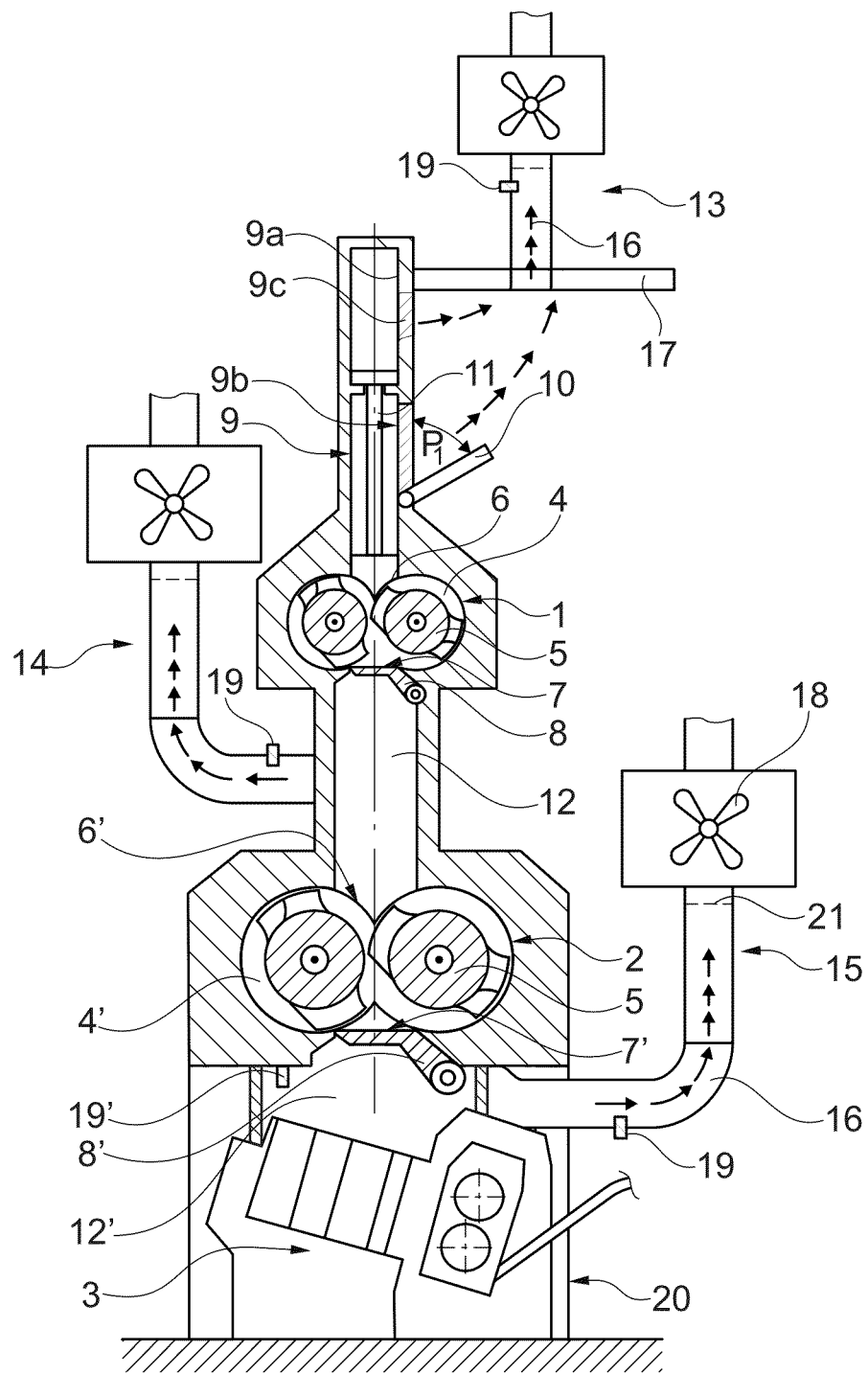

METHOD FOR PRODUCING A RUBBER MIXTURE WITH DETECTION OF VOLATILE ORGANIC COMPOUNDS

FIELD OF THE INVENTION

The invention relates to a process for producing a rubber mixture in a mixing apparatus having at least one mixing chamber in which rotors are disposed, where a plant control system by means of which process parameters especially including the speed of the rotors, the suction output of a suction device and the mixing time are controlled by open- or closed-loop control is provided, where at least one rubber is mixed in the mixing chamber with at least one filler, especially silica, preferably with addition of at least one coupling agent, especially a silane, and where the gas mixture present in and above the mixing chamber is sucked out by means of the suction device.

BACKGROUND OF THE INVENTION

It is known that silica can be used as filler in rubber mixtures. In the tire industry, silica-containing rubber mixtures are of major importance owing to their use in modern motor vehicle tires. In the production of rubber mixtures of this kind is too customary, for improvement of the processability of the rubber mixtures and for attachment of the polar silica to nonpolar rubbers, to use what are called coupling agents which react with the polar groups of silica and enable binding to the rubber. Such coupling agents are especially bifunctional organosilanes which have at least one alkoxy, cycloalkoxy or phenoxy group as leaving group on the silicon atom and have, as further functionality, a group which can, optionally after dissociation, enter into a chemical reaction with the double bonds of the rubber. In these coupling reactions, alcohols in particular, for example ethanol, are eliminated in considerable amounts and escape from the mixture during the mixing operation in gaseous form owing to the high mixing temperatures in the range from 120° to 170°. These gaseous alcohols can readily ignite, flash or explode under air, and so it is necessary to monitor the amount of alcoholic gases released and if necessary intervene in the mixing operation. It has been customary to date to check the amount of gaseous alcohols released by random sampling. Such random sampling is conducted mainly in the case of rubber mixtures where release of greater amounts of alcoholic gases is expected. By means of suction devices, the alcoholic gases released are sucked out of the mixing apparatus.

Since silicas impart advantageous properties to the rubber materials manufactured from the rubber mixtures, for example treads of pneumatic vehicle tires, especially with regard to avoidance of the trade-off between rolling resistance and wet grip and owing to the higher abrasion resistance achievable in the case of treads, there is a trend to fill rubber mixtures with ever greater proportions of silica. The amounts of alcoholic gases released on silanization are considerable even now, and so the suction devices are operated with high-performance suction for safety-relevant reasons. The energy demand for suction is therefore enormous.

Further volatile organic compounds that are frequently released on mixing of rubber mixtures, especially on mixing of rubber mixtures with reinforcing fillers and coupling agents or with resins, are, for example, esters, ethers and combustible hydrocarbons.

It is an object of the invention to conduct a process of the type specified at the outset in a safer and more energy-efficient manner than before.

SUMMARY OF THE INVENTION

The stated object is achieved in accordance with the invention by a process in which volatile organic compounds, especially alcoholic gases, present in the gas mixture sucked in are detected continuously in the suction device, where, in the event of exceedance of a concentration of organic compounds in the gas mixture sucked in that has been defined as the control limit, the concentration measured is employed as control variable in the plant control system for closed-loop control of at least one of the process parameters, where, in the event of exceedance of a concentration of organic compounds in the gas mixture sucked in that has been defined as the safety limit, there is a safety shutdown of the mixing apparatus by means of the plant control system.

BRIEF DESCRIPTION OF THE DRAWINGS

The apparatus shown in the sole FIGURE comprises a tandem mixer having an upper machine 1 and a lower machine 2.

DETAILED DESCRIPTION OF THE INVENTION

According to the invention, therefore, the concentration of volatile organic compounds in the gas mixture sucked in is measured constantly and monitored reliably. If the measured concentration exceeds a control limit, the concentration ascertained is employed as control variable for at least one process parameter. The control intervention can also be effected during the mixing of a batch. These automated interventions into the process or the course of the process enable control of the process in real time. If the measured concentration exceeds the safety limit, there is a safety shutdown of the mixing apparatus, such that enrichment of potentially hazardous, especially inflammable, gas mixtures is avoided.

In a preferred embodiment, one process parameter which is controlled is the suction output of the suction device. This measure enables very energy-efficient suction at a low concentration of volatile organic compounds or in the absence of volatile organic compounds in the gas mixture that has been sucked in. More particularly, the amounts of volatile organic compounds formed are very different in different rubber mixtures. The amount of volatile organic compounds formed also varies during the mixing of a rubber mixture. For example, at the start of a mixing operation, there tends to be formation of a smaller amount or none of these compounds since the mixture is still "cold", and no reactions, for example silanization, are taking place yet. A low suction output is therefore sufficient at this stage of the process. The control of the suction output is also particularly advantageous because it does not affect the progression of the actual mixture production, and so a very high throughput is also still possible. By increasing the suction output, the potentially hazardous gases are rapidly transported out of the apparatus, such that enrichment of these gases within the mixing apparatus is virtually ruled out.

In a further preferred alternative embodiment, the volume flow rate of the suction device is controlled by means of at least one electronically actuatable flap that can be inserted into a waste air pipe of the suction device. This variant is preferred when multiple suction devices are being operated by means of a common suction. The cross section of the waste air pipe in question is reduced by inserting the flap, such that the suction output of the suction is concentrated to the further suction devices.

In a further preferred embodiment, one process parameter which is controlled is the mixing time. As soon as none or virtually no organic compounds are being registered in the suction devices any longer, the rubber mixture is correspondingly mixed to completion, optionally with addition of further mixture components. As a result of the control of the mixing time as a function of the measured concentration of volatile organic compounds, the mixing process therefore proceeds particularly effectively, the throughput is particularly high and the energy expenditure and mixing time are matched to the respective rubber mixture.

In a further preferred execution, one process parameter which is controlled is the speed of the rotors present in the mixing chamber. The speed of the rotors directly controls the energy input into the mixture and hence the mixing temperature. If the measured concentrations of volatile organic compounds are low, the speed can be increased, such that the mixing operation is accelerated and the throughput is increased.

It is preferably the case that the speed of the rotors present in the mixing chamber is reduced on exceedance of the control limit, and the rotors are especially stopped briefly.

This reduces the energy input into the mixture and results in slower release of the volatile organic compounds.

Further preferred variants of the process relate to the safety shutdown of the mixing apparatus.

In a preferred embodiment, the suction output of the suction device is maximized on safety shutdown. The volatile organic compounds present in the gas mixture that has been sucked in are transported away particularly rapidly in this way.

In a further preferred embodiment, all rotors are stopped on safety shutdown. The energy input into the rubber mixture is abruptly ended. This effectively counteracts further heating of the rubber mixture and the associated formation of volatile organic compounds.

If the mixing apparatus used for the process comprises a ram, it is advantageous when the ram is lowered on safety shutdown. This results in a rapid increase in pressure in the mixing chamber and therefore counteracts the exit of the volatile organic compounds, or delays the exit of the volatile organic compounds. Even if the gases ignite, the possibly burning rubber mixture is present in the mixing chamber, in which the fire rapidly goes out again since barely any oxygen gets into the mixing chamber as a result of the lowered ram.

If the mixing apparatus comprises a shaft having a feed opening, it is advantageous when the feed opening is closed and preferably locked on safety shutdown. This additionally reduces the oxygen supply.

If the mixing apparatus comprises a shaping unit, it is advantageous when the shaping unit is stopped on safety shutdown. This prevents any rubber mixture at risk of fire from being shaped and additional volatile organic compounds from escaping.

Preferably, on exceedance of the control limit and/or on exceedance of the safety limit, air, carbon dioxide and/or nitrogen is/are introduced into the suction device. This results in abrupt dilution of the respective gas mixture sucked in. This variant is preferable, for example, when the control limit is an "environmental protection limit". Introduction of carbon dioxide and/or nitrogen is advantageous particularly when the safety limit is exceeded since these gases do not support combustion.

It is also advantageous when water is sprayed into the suction device on exceedance of the control limit and/or on exceedance of the safety limit. This likewise abruptly dilutes the gas mixture sucked in and additionally simultaneously effectively cools it down.

In a further preferred embodiment, the concentration of organic compounds in the gas mixture that has been sucked in is measured by means of a flame ionization detector, an exothermicity sensor, a semiconductor detector, a photoionization detector or an infrared detector. Flame ionization detector, semiconductor detector and exothermicity sensor measure in a non-specific manner, i.e. detect the entire spectrum of volatile organic compounds, and hence give a total concentration of volatile organic compounds. By means of infrared detectors, individual gases are specifically quantifiable in a known manner, such that infrared detectors are preferred especially when the volatile organic compounds formed are known, for example in the mixing operation of rubber mixtures in which a silanization is being conducted. Exothermicity sensors are advantageously operable in a particularly simple manner and the suction devices integratable.

In a further preferred embodiment, the volume flow rate of the air sucked in is measured by means of a volume flow meter disposed in the suction device, where the volume flow rate is an input variable in the control of the process parameter(s), especially of the suction output of the suction device. More particularly, the volume flow meter determines whether the flow rate of the gas mixture sucked in in the suction device does not go below a particular minimum value. This ensures that no fine dusts, for example dusts originating from fillers, collect in the suction devices. In normal operation, in particular, closed-loop control that enables particularly noiseless operation of the suction device is effected. The volume flow rate therefore self-regulates to some degree, or is controlled with the volume flow meter and adjusted via the suction output of the suction devices.

Further features, advantages and details of the invention are now described in detail with reference to the sole FIGURE, which shows a simplified schematic diagram of an apparatus for production of a rubber mixture.

The apparatus shown in the sole FIGURE comprises a tandem mixer having an upper machine 1 and a lower machine 2. Below the tandem mixer there is disposed a shaping unit 3 in a chamber 20, for example a roller system or a roller head extruder. A plant control system that is not shown and does not form part of the subject matter of the invention controls particular mixing parameters or process parameters during the mixing operation by open-loop and closed-loop control.

The upper machine 1 has an upper mixing chamber 4, and the lower machine 2 has a lower mixing chamber 4', with two rotors 5 executed in a manner known per se disposed in each mixing chamber 4, 4'. Each mixing chamber 4, 4' has an introduction opening 6, 6' above the respective rotors 5, and an exit opening 7, 7' opposite the respective introduction opening 6, 6' beneath the rotors 5. Below the respective mixing chamber 4, 4' is disposed a pivotable saddle 8, 8', by means of which the exit opening 7, 7' can be opened and closed.

A shaft 9 with shaft walls 9a opens into the introduction opening 6 of the upper mixing chamber 4. A feed opening 9b is formed in the side of a shaft wall 9a, and above the feed opening 9b and waste air opening 9c. By means of a pivotable loading flap 10, the feed opening 9b is closable, as indicated by the arrow $P_1$. Within the shaft 9 there is a pressurized ram 11 which is movable upward and downward. With the ram 11 moved upward and the feed opening 9b open, mixture constituents can be introduced into the upper mixing chamber 4 via the feed opening 9b. By means of the ram 11, mixture present in the upper mixing chamber 4 can be forced to the rotors 5 present therein.

A transfer shaft 12 runs between the exit opening 7 of the upper mixing chamber 4 and the introduction opening 6 of the lower mixing chamber 4', through which, after opening of the exit opening 7 of the upper mixing chamber 4, the mixture can be transferred from the upper mixing chamber 4 into the lower mixing chamber 4'. Below the exit opening 7' of the lower mixing chamber 4', a transfer shaft 12' runs to the shaping unit 3. By opening the saddle 8' of the lower mixing chamber 4', the mixture is applied to the shaping unit 3 and then rolled to the desired thickness by means thereof. The rolled rubber mixture is transported out of the chamber 20 via a gap and processed further according to its end use; for example, the rubber mixture, for subsequent manufacture of a tread of a pneumatic vehicle tire, is extruded in sheet form in a manner known per se.

Three suction devices 13, 14, 15 are disposed laterally in the tandem mixer. Each suction device 13, 14, 15 has a pipeline assembled from multiple waste air pipes 16, which leads, for example, to a roof of the respective production hall or to another suitable release site for the gases and vapors that have been sucked in. The upper suction device 13 is above the waste air opening 9c and has a suction hood 17 that adjoins the corresponding shaft wall 9a. The middle suction device 14 is connected to the transfer shaft 12. The lower suction device 15 is connected to the transfer shaft 12' just above the shaping unit 3.

Each suction device 13, 14, 15 in the working example shown has a dedicated suction element, a ventilator 18 in the working example shown, and a dust filter 21 connected upstream of the ventilator 18. The suction device 13 has a gas sensor 19 positioned within the waste air pipe 16 directly connected to the suction hood 17 for continuous measurement of volatile organic compounds (VOCs). Further gas sensors 19 are positioned in the waste air pipe 16 connected directly in each case to the transfer shaft 12 and in the to the transfer shaft 12'. Each gas sensor 19 is especially a flame ionization detector, an exothermicity sensor, a semiconductor detector, a photoionization detector or an infrared detector. Flame ionization detector, semiconductor detector and exothermicity sensor measure in a non-specific manner, i.e. detect the entire spectrum of volatile organic compounds, and hence give a total concentration of volatile organic compounds. By means of infrared detectors, individual gases are specifically quantifiable in a known manner, such that infrared detectors are preferred especially when the volatile organic compounds formed are known, for example in the mixing operation of rubber mixtures in which a silanization is being conducted. Exothermicity sensors are advantageously operable in a particularly simple manner and integratable into the suction devices in a particularly simple manner.

As indicated by multiple arrows in the sole FIGURE, the suction devices 13, 14, 15 continuously suck in the corresponding gas mixture by means of the ventilators 18, such that there is continuous and reliable measurement of the gases in the gas mixture sucked in. The output of the ventilators 18 required for continuous measurement of the gas mixture by means of the gas sensors 19 in real time is low, and so the energy expenditure is also low.

If a rubber mixture that has been filled with silica and mixed with a silane is being mixed in the tandem mixer, alcoholic gases form in the mixing chamber 4, 4' at the customary mixing temperatures of, for example, 140° to 160°, and these escape from the rubber mixture. The silanization can be conducted here either in the upper mixing chamber 4 or in the lower mixing chamber 4'. By means of the gas sensors 19, the alcoholic gases present in the gas mixture sucked in by the respective suction device 13, 14, 15 are detectable and the amount or concentration thereof in the gas mixture is measurable. The concentration of alcoholic gases measured by means of the gas sensors 19 in the gas mixture that has been sucked in is the actual concentration. This is a control variable for closed-loop control of process parameters of the tandem mixer, with implementation of a control intervention on exceedance of one or more concentration(s) of alcoholic gases that are defined as permissible in the gas mixture. A first concentration of alcoholic gases in the gas mixture here defines a limit designated as the control limit, and a second concentration of alcoholic gases in the gas mixture a limit designated as the safety limit. As elucidated hereinafter, the control intervention may relate to one or more process parameters, and also bring about a safety shutdown of the apparatus.

Any alcoholic gases released on mixing in the upper machine 1 flow past the ram 11, are subsequently sucked out by the suction device 13 through the opening 9a, and are guided past and detected by the gas sensor 19 present therein. If this gas sensor 19 detects an actual concentration of alcoholic gases above the control limit in the gas mixture that has been sucked in, a control intervention is implemented, relating, for example, to the speed of the rotors 5. The speed of the rotors 5 is reduced, which lowers the energy input of the rotors 5 into the mixture and hence the mixing temperature (temperature in the mixing chamber), such that the silanization is slowed and there is a fall in the concentration of alcoholic gases in the gas mixture in the upper mixing chamber 4. It may be the case that the mixture, after a control intervention relating to the speed of the rotors 5, is mixed for longer overall, such that high mixing quality is still maintained, and the silanization is especially conducted to completion. If required, the rotors 5 in the upper mixing chamber 4 can also be stopped.

A further possible control intervention relates to the suction output of the suction device 13. If the actual concentration of alcoholic gases in the gas mixture exceeds the control limit, the speed of the corresponding ventilator 18 is increased, and so the gas mixture containing the alcoholic gases formed is sucked out more quickly and the concentration of alcoholic gases in the gas mixture is kept below the maximum concentration. Since this control intervention advantageously does not relate to any mixing parameter, for example the speed of the rotors, the mixing time for achievement of the desired mixing quality remains unchanged.

As soon as the mixture from the upper machine 1 has been transferred to the lower machine 2, any alcoholic gases released in the mixing operation in the lower machine 2 are sucked in by means of the middle suction device 14. If the gas sensor 19 positioned there registers an actual concentration of alcoholic gases in the gas mixture above the control limit, a control intervention relating to the speed of the rotors 5 in the lower mixing chamber 4' and/or one relating to the speed of the ventilator 18 in the suction device 14 is implemented.

Preferably, the speed of the rotors 5 is controlled in each case by means of a PID controller (proportional-integral-derivative controller).

As soon as the mixture is ejected from the lower machine 2, the gas sensor 19 in the corresponding waste air pipe 16 of the lower suction device 15 measures the concentration of alcoholic gases in the gas mixture sucked in. If a concentration above the control limit is measured by the gas sensor 19, the suction output of the suction device 16 is increased.

In the working example shown, a further gas sensor 19' is disposed just below the lower mixing chamber 4'. If the gas sensor 19' measures an actual concentration of alcoholic gases above the control limit in the gas mixture sucked in, the suction output of the suction device 16 is likewise increased. These measures effectively prevent any enrichment of alcoholic gases in the region below the lower mixing chamber 4', in the region of the shaping unit 3 in the working example shown.

Preferably, the suction output of the suction devices 13, 14, 15 is controlled in such a way that it is matched to the respectively detected local concentration of alcoholic gases in the respective gas mixture sucked in. These measures particularly effectively lower the energy expenditure for operation of the apparatus. In an alternative variant, all suction devices 13, 14, 15 or at least two of the suction devices 13, 14, 15 have a common central suction element.

If one of the gas sensors 19 or, if present, the gas sensor 19' registers a concentration of alcoholic gases in the gas mixture sucked in that is above the safety limit mentioned, a safety shutdown of the apparatus is implemented. In this case, all rotors 5 are stopped, the suction output of the suction devices 13, 14, 15 is maximized, the ram 9 is lowered and the feed opening 9b is closed with the loading flap 10, which is optionally additionally locked to prevent opening. It may also additionally be the case that, in the event of a safety shutdown, the shaping unit 3 is stopped, such that a rubber mixture from which correspondingly large amounts of alcoholic gases are escaping is at least initially not rolled out and does not leave the chamber. As long as the rubber mixture remains in the chamber 20, the alcoholic gases can be rapidly sucked out by the suction device 15.

The invention is not limited to the embodiments described.

A volume flow meter may be disposed in each of the suction devices 13, 14, 15, which measures the volume flow rate of the gas mixture sucked in. The volume flow rate measured may constitute a further control variable in addition to the actual concentration mentioned of alcoholic gases in the gas mixture sucked in. The volume flow rate as control variable here regulates the suction output of the suction devices, which constitutes the controlled process parameter. The volume flow meter determines whether the flow rate of the gas mixture sucked in does not go below a particular minimum value. This ensures that no fine dusts, for example of fillers, collect in the waste air pipes 16 and the ventilators 18. In addition, the flow rate is controlled in such a way that no loud droning or whistling is caused during normal operation. The volume flow rate therefore self-regulates to some degree, or is controlled with the volume flow meter and adjusted via the suction output of the suction devices. In the event of any safety shutdown of the tandem mixer and an associated maximization of the suction conduit of the ventilators 18, any droning or whistling is of course unimportant.

If a mixer having a ram is provided, as is the case in the working example shown for the upper machine 1, an optional or additional control variable is the ram position. If a concentration of alcoholic gases that exceeds the maximum concentration is detected in the gas mixture, the ram remains in its lower position or is lowered. It may also be the case that the loading flap 10 is automatically locked as soon as a concentration of alcoholic gases exceeding the maximum concentration is detected in the gas mixture.

The suction devices 13, 14, 15 may also be provided with one or more secondary air flap(s), each of which especially has a nonreturn device. In this variant, depending on the concentration of alcoholic gases, it is possible for the secondary air flap(s) to be opened and for such large amounts of fresh air to flow into the suction devices 13, 14, 15. In this way too, it is advantageously possible to rapidly reduce the concentration of alcoholic gases. This is particularly advantageous especially in the case of very high concentrations of alcoholic gases in the gas mixture sucked in and in the event of very rapidly rising concentrations of alcoholic gases in the gas mixture sucked in.

Rather than the control of the suction output of the ventilators (control variable), it is possible that electronically actuatable flaps are provided in the pipelines for volume flow control.

It may also be the case that the concentration of alcoholic gases in the gas mixture sucked in is reduced not by fresh air but via a feed of carbon dioxide and/or nitrogen via corresponding carbon dioxide or nitrogen conduits connected to the waste air pipes 16. This variant is advantageous especially because carbon dioxide or nitrogen does not support combustion. Feeding of carbon dioxide or nitrogen is especially preferred when the measured concentration of alcoholic gases in the gas mixture sucked in is above the explosion limit to be expected in each case.

In a further variant, a spray nozzle for spraying in water is optionally or additionally connected to at least one of the waste air pipes 16 of the suction device 13, 14, 15.

The safety limit and the control limit fundamentally relate to concentrations of volatile organic compounds in the gas mixture formed.

LIST OF REFERENCE NUMERALS

1 . . . upper machine
2 . . . lower machine
3 . . . shaping unit
4 . . . upper mixing chamber
4' . . . lower mixing chamber
5 . . . rotors
6, 6' . . . introduction opening
7, 7' . . . exit opening
8, 8' . . . saddle
9 . . . shaft
9a . . . shaft wall
9b . . . feed opening
9c . . . waste air opening
10 . . . loading flap
11 . . . ram
12, 12' . . . transfer shaft
13, 14, 15 . . . suction devices
16 . . . waste air pipe
17 . . . suction hood
18 . . . ventilator
19, 19' . . . gas sensor
20 . . . chamber
21 . . . dust filter

The invention claimed is:
1. A process for producing a rubber mixture in a mixing apparatus comprising at least one mixing chamber in which rotors are disposed,
wherein plant control system process parameters, including the speed of the rotors, the suction output of a suction device, and the mixing time, are controlled by open- or closed-loop control is provided;

wherein at least one rubber is mixed in the at least one mixing chamber with at least one filler and at least one coupling agent; and wherein the suction device removes a gas mixture present in and above the at least one mixing chamber;

wherein volatile organic compounds present in the gas mixture are detected continuously in the suction device;

wherein, in the event of exceedance of a concentration of the volatile organic compounds in the gas mixture that has been defined as a control limit, the concentration measured is employed as a control variable in the plant control system for closed-loop control of at least one of the process parameters; and, wherein, in the event of exceedance of a concentration of the volatile organic compounds in the gas mixture that has been defined as a safety limit, the plant control system causes a safety shutdown of the mixing apparatus.

2. A process as claimed in claim 1, wherein the at least one filler is silica and wherein the at least one coupling agent is silane.

3. The process as claimed in claim 1, wherein one process parameter is controlled.

4. The process as claimed in claim 3, wherein the one process parameter controlled is the suction output of the suction device.

5. The process as claimed in claim 3, wherein the one process parameter controlled is the mixing time.

6. The process as claimed in claim 3, wherein the one process parameter which is controlled is the speed of the rotors present in the mixing chamber.

7. The process as claimed in claim 6, wherein the speed of the rotors present in the mixing chamber is reduced on exceedance of the control limit.

8. The process as claimed in claim 7, wherein the speed of the rotors present in the mixing chamber is reduced as a stoppage of the rotors.

9. The process as claimed in claim 7, wherein the speed of the rotors present in the mixing chamber is reduced on exceedance of the control limit by brief stoppage of the rotors.

10. The process as claimed in claim 1, wherein at least one electronically actuatable flap inserted into a waste air pipe of the suction device controls a volume flow rate of the suction device.

11. The process as claimed in claim 1, wherein the suction output of the suction device is maximized in the event of a safety shutdown.

12. The process as claimed in claim 1, wherein the rotors are stopped in the event of a safety shutdown.

13. The process as claimed in claim 1, wherein the mixing apparatus further comprises a ram, wherein the ram is lowered in the event of a safety shutdown.

14. The process as claimed in claim 1, wherein the mixing apparatus further comprises a shaft having a feed opening, and wherein the feed opening is closed in the event of a safety shutdown.

15. The process as claimed in claim 14, wherein the feed opening is locked in the event of a safety shutdown.

16. The process as claimed in claim 1, wherein the mixing apparatus further comprises a shaping unit, and wherein the shaping unit is stopped in the event of a safety shutdown.

17. The process as claimed in claim 1, wherein one or more of air, carbon dioxide or nitrogen is/are introduced into the suction device on exceedance of the control limit.

18. The process as claimed in claim 1, wherein one or more of air, carbon dioxide or nitrogen is/are introduced into the suction device on exceedance of the safety limit.

\* \* \* \* \*